Patented Sept. 7, 1926.

1,599,383

UNITED STATES PATENT OFFICE.

WILLIAM G. O'BRIEN AND PAUL BEEBE, OF AKRON, OHIO, ASSIGNORS TO THE GOODYEAR TIRE & RUBBER COMPANY, OF AKRON, OHIO, A CORPORATION OF OHIO.

METHOD OF MAKING RUBBERIZED FIBROUS COMPOSITIONS.

No Drawing.   Application filed March 22, 1923.   Serial No. 626,894.

Our invention relates to the manufacture of rubberized fibrous material which is intended, chiefly, as a substitute for leather, and which is of a tough, flexible, porous, water-resistant nature.

The object of our invention consists in providing a novel method of manufacturing material of the character designated whereby several of the steps heretofore considered necessary for the production thereof are eliminated.

Heretofore, it has been suggested that rubberized fibrous material be manufactured by mixing a quantity of beaten fibers with a quantity of rubber in solution. In practicing this method, quantities of sulphur dioxide and of hydrogen sulphide are mixed with the rubber cement prior to the addition of the fibers. After the fibers have been thoroughly dispersed in the liquid in any suitable manner, the rubber is precipitated upon the fibers, either by the addition to the mixture of a rubber precipitant, by the suitable control of the temperature of the mixture, or by any other suitable method. After precipitation of the rubber upon the fibers, they are drained from the liquid and permitted to stand for a short period of time to permit of gellation. The gellation is caused by the interaction of the sulphur dioxide and the hydrogen sulphide with the rubber, resulting in a slow cure thereof.

After a suitable degree of gellation has been produced, the mass of rubber coated fibers is subjected to several successive treatments, starting with a bath in a solution of approximately 40% rubber precipitant and 60% rubber solvent, and ending with a bath of substantially pure rubber precipitant. The solvent and precipitant usually employed are toluol and alcohol, respectively. The purpose of these baths is to remove from the rubber and the fibers all rubber solvent. After the solvent has been replaced by alcohol, the resulting mass is pressed to the desired size and shape, the drying action usually taking place simultaneously with the pressing, this being known as the "wet press treatment." When the product has reached its desired form and is thoroughly dried, it may then be employed for the purpose for which it was originally intended, as the interaction of the hydrogen sulphide and sulphur dioxide will complete the cure of the rubber without further attention from attendants.

By our invention we have rendered possible the elimination of the successive baths, to which the product has heretofore been subjected after completion of the gellation thereof, without impairing the product. The product is formed by the deposition of the rubber on the fibers by either of the methods previously described, and is then permitted to gel. The resulting product is then heated to dry the same, and is afterwards pressed to the desired shape and size.

In order to precipitate the rubber upon the fibers, the mixture of which the rubber in solution forms a portion, must contain a quantity of rubber precipitant, the proportion of which to the rubber solvent varies with the temperature of the mixture. At 70° F. a mixture of approximately 23% precipitant and 77% solvent becomes a precipitating mixture. As the temperature is raised, the percentage of alcohol necessary to keep the mixture a precipitant increases. Therefore, when a mat, wet with the liquid from the precipitating mixture, is heated to remove the liquid and dry the product, the liquid contained therein tends to become a solvent mixture. The movement of this mixture to the surface, upon being heated, tends to bring the rubber from the fibers in the center of the mass to the surface, which is, of course, very objectionable.

In order to eliminate this objectionable feature, by our present invention, the product is subjected to a bath of superheated vapor of a non-solvent of rubber, preferably the same precipitant which forms a portion of the precipitating mixture. The vapor of the precipitant permeates the product and prevents the liquid from becoming a solvent at higher temperatures. In fact, instead of permitting the escaping mixture to carry the rubber to the surface of the product, it causes the rubber throughout the entire product to shrink more tightly about the fibers. In addition, the vapor being superheated serves to dry the product. Thus the superheated vapor of the non-solvent of rubber, preferably alcohol, simultaneously causes the removal of the rubber solvent and the drying of the product.

When rubber is cured by the interaction of sulphur dioxide and hydrogen sulphide, the complete cure can not be effected immediately but requires an interval of time. During this interval, the condition of the rubber is such that the product may be dried and pressed to the desired size and shape, which will be retained thereby. Thus the dried, or partially dried, rubber coating serves to weld the fibers together at their points of contact.

With the product manufactured in accordance with the method mentioned as being heretofore suggested, considerable quantities of rubber solvent and rubber precipitant must be employed, particularly in the washing, or solvent displacing operation. A relatively large portion of these chemicals may be saved by a recovering process. However, it is impossible to eliminate the losses entirely. Also, after being washed with the rubber precipitant the product must be compressed to the desired size and shape while wet, because, after being dried, it will not retain the shape and size to which it has been compressed. If dry pressed, the tensile strength on being subsequently wetted is materially lower than if it has been originally wet pressed.

By employing our invention the washing or displacing operation is materially simplified, as are the manufacturing steps necessary for the recovery of the chemicals employed therein. The losses are therefore materially reduced, the manufacture of the product is greatly simplified, and the cost thereof reduced. This is accomplished by the simplification of the solvent displacing process and the dry pressing, which is materially easier, from a manufacturing standpoint, than is the wet pressing of the product.

Although we have described in detail but a single application of our invention, it will be apparent to those skilled in the art that it is not so limited, but that various minor modifications and changes may be made therein without departing from the spirit of our invention, or from the scope of the appended claims.

What we claim is:—

1. A method of treating a material containing rubber and a rubber solvent, which comprises removing the solvent therefrom by subjecting the same to the action of vapors of a precipitant of rubber.

2. A method of treating a material containing rubber and a rubber solvent, which comprises removing the solvent therefrom by subjecting the same to the action of superheated vapors of alcohol.

3. A method of treating a material containing rubber and a rubber solvent, which comprises removing the solvent therefrom by subjecting the same to the action of superheated vapors of a non-solvent of rubber.

4. A method of treating a material containing rubber and a rubber solvent, which comprises removing the solvent therefrom by subjecting the same to the action of superheated vapors of a rubber precipitating agent.

5. The method of manufacturing a rubberized fibrous material which consists of precipitating rubber upon a quantity of fibers, and removing the rubber solvent therefrom by subjecting the same to the drying action of superheated vapor of a rubber precipitating agent.

6. The method of manufacturing a rubberized fibrous material which consists of precipitating rubber upon a quantity of fibers, and drying the rubber coated fibers by subjecting them to the action of superheated alcohol vapor.

7. The method of manufacturing a rubberized fibrous material which consists of precipitating rubber upon a quantity of fibers from a toluol-alcohol mixture, and drying and removing the toluol therefrom by subjecting them to the action of superheated alcohol vapor.

In witness whereof, we have hereunto signed our names.

WILLIAM G. O'BRIEN.
PAUL BEEBE.